(12) United States Patent
Lalani et al.

(10) Patent No.: US 11,475,064 B2
(45) Date of Patent: *Oct. 18, 2022

(54) SYSTEM AND METHOD IN A DATABASE SYSTEM FOR CREATING A FIELD SERVICE WORK ORDER

(71) Applicant: salesforce.com, inc., San Francisco, CA (US)

(72) Inventors: Roojuta Lalani, Fremont, CA (US); Karthik Shankar, Castro Valley, CA (US); Neeraj Ahuja, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 699 days.

This patent is subject to a terminal disclaimer.

(21) Appl. No.: 15/617,258

(22) Filed: Jun. 8, 2017

(65) Prior Publication Data

US 2018/0357100 A1  Dec. 13, 2018

(51) Int. Cl.
*G06F 16/901* (2019.01)
*G06F 16/951* (2019.01)
*G06F 16/22* (2019.01)

(52) U.S. Cl.
CPC ...... *G06F 16/9017* (2019.01); *G06F 16/2228* (2019.01); *G06F 16/951* (2019.01)

(58) Field of Classification Search
CPC .. G06F 9/5011; G06F 16/9038; G06F 16/951; G06F 9/4881; G06F 16/9017; G06F 16/2228

See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |

(Continued)

*Primary Examiner* — Mariela Reyes
*Assistant Examiner* — Fatima P Mina
(74) *Attorney, Agent, or Firm* — LKGlobal | Lorenz & Kopf, LLP (57) ABSTRACT

A method in a database system is disclosed. The method comprises generating a task template object from a platform entity with polymorphic lookup capability that can map to multiple tenant domains wherein the task template object contains one or more task completion storage records for storing task-specific information, converting the task template object into a work-type object by storing task-specific information in the one or more task completion storage records wherein the work-type object comprises a work-type object identifier (ID), a first record for recording the database ID of one or more work order objects mapped to the work-type object, and a first task completion storage record for storing a first type of task-specific information. The method further comprises generating a work order object for a task and providing the work order object with access to the task-specific information by linking the work-type object to the work order object.

20 Claims, 6 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobsen |
| 8,015,495 B2 | 9/2011 | Achacoso et al. |
| 8,032,297 B2 | 10/2011 | Jakobsen |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074302 A1* | 4/2003 | Cope ............... G16H 10/60 705/37 |
| 2003/0074418 A1 | 4/2003 | Coker et al. |
| 2003/0115073 A1* | 6/2003 | Todd ............... G06Q 30/06 705/1.1 |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2006/0206370 A1* | 9/2006 | Skopal ............... G06Q 10/06 718/102 |
| 2007/0192402 A1* | 8/2007 | Dean ............... G06Q 10/06 709/202 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0287105 A1* | 11/2010 | Araki ............... G06Q 10/101 705/300 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah et al. |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0081685 A1* | 3/2014 | Thacker ............... G06Q 10/06 705/7.12 |
| 2014/0108971 A1* | 4/2014 | No ............... G06F 3/0482 715/762 |

(56) References Cited

U.S. PATENT DOCUMENTS

| | | | |
|---|---|---|---|
| 2015/0039380 A1* | 2/2015 | Bellini, III | G06Q 10/06316 |
| | | | 705/7.26 |
| 2015/0227518 A1* | 8/2015 | Kalian | G06F 16/2358 |
| | | | 707/725 |
| 2016/0048844 A1* | 2/2016 | Vogt, Jr. | G06Q 30/018 |
| | | | 705/317 |
| 2016/0102879 A1* | 4/2016 | Guest | G05B 15/02 |
| | | | 700/276 |
| 2016/0378785 A1* | 12/2016 | Liu | G06F 16/27 |
| | | | 707/610 |
| 2018/0137153 A1* | 5/2018 | Gaikwad | G06F 16/217 |

* cited by examiner

FIG. 6

SYSTEM AND METHOD IN A DATABASE SYSTEM FOR CREATING A FIELD SERVICE WORK ORDER

TECHNICAL FIELD

Embodiments of the subject matter described herein relate generally to computer systems, and more particularly, to methods and systems for providing data object templates in a multi-tenant database system.

BACKGROUND

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database").

A multi-tenant system stores data as objects. Tenants may be allowed to create and store custom objects, or they may be allowed to customize standard objects, for example, by creating custom fields for standard objects.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The subject matter described herein discloses apparatus, systems, techniques and articles for providing a work-type object that may be used to generate a work order object such as a work order object. The work-type object can store task-specific information in task completion storage records for use with a work order object. The work-type object may also store database identifiers for work order objects that are linked to the work-type object.

Figure 1:
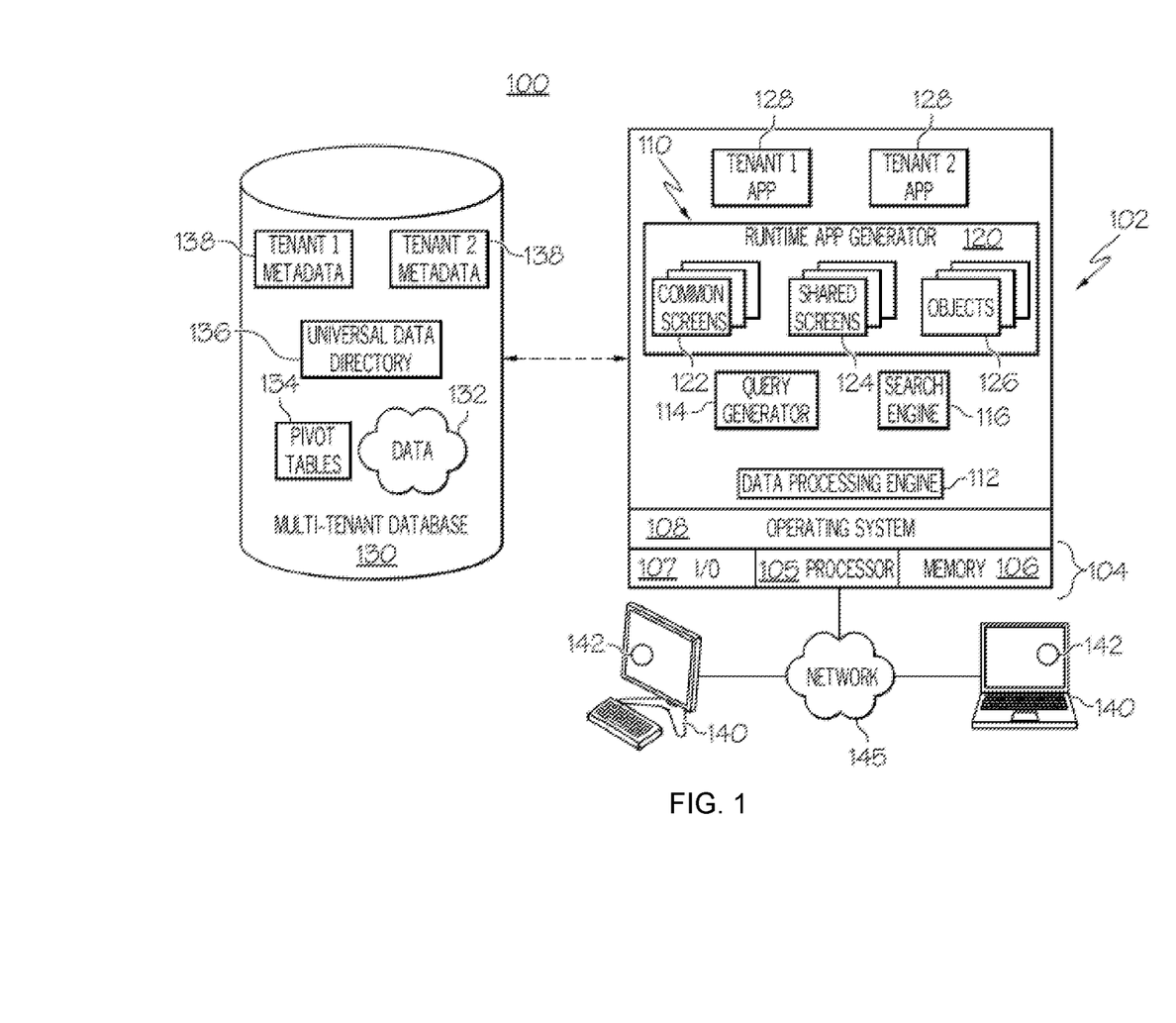
FIG. 1 is a block diagram depicting an exemplary embodiment of an on-demand multi-tenant database system.

FIG. 1 and the following discussion are intended to provide a brief, general description of one non-limiting example of an example environment in which the embodiments described herein may be implemented. Those skilled in the art will appreciate that the embodiments described herein may be practiced with other computing environments.

FIG. 1 is a block diagram depicting an exemplary embodiment of an on-demand multi-tenant database system 100. The illustrated multi-tenant system 100 of FIG. 1 includes a server 102 that dynamically creates and supports virtual applications 128 based upon data 132 from a common database 130 that is shared between multiple tenants, alternatively referred to herein as a multi-tenant database. Data and services generated by the virtual applications 128 are provided via a network 145 to any number of client devices 140, as desired. Each virtual application 128 is suitably generated at run-time (or on-demand) using a common application platform 110 that securely provides access to the data 132 in the database 130 for each of the various tenants subscribing to the multi-tenant system 100. In accordance with one non-limiting example, the multi-tenant system 100 is implemented in the form of an on-demand multi-tenant customer relationship management (CRM) system that can support any number of authenticated users of multiple tenants.

As used herein, a "tenant" or an "organization" should be understood as referring to a group of one or more users or entities that shares access to common subset of the data within the multi-tenant database 130. In this regard, each tenant includes one or more users associated with, assigned to, or otherwise belonging to that respective tenant. To put it another way, each respective user within the multi-tenant system 100 is associated with, assigned to, or otherwise belongs to a particular tenant of the plurality of tenants supported by the multi-tenant system 100. Tenants may represent customers, customer departments, business or legal organizations, and/or any other entities that maintain data for particular sets of users within the multi-tenant system 100 (i.e., in the multi-tenant database 130). For example, the application server 102 may be associated with one or more tenants supported by the multi-tenant system 100. Although multiple tenants may share access to the server 102 and the database 130, the particular data and services provided from the server 102 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 132 belonging to or otherwise associated with other tenants.

The multi-tenant database 130 is any sort of repository or other data storage system capable of storing and managing the data 132 associated with any number of tenants. The database 130 may be implemented using any type of conventional database server hardware. In various embodiments, the database 130 shares processing hardware 104 with the server 102. In other embodiments, the database 130 is implemented using separate physical and/or virtual database server hardware that communicates with the server 102 to perform the various functions described herein. In an exemplary embodiment, the database 130 includes a database management system or other equivalent software capable of determining an optimal query plan for retrieving and providing a particular subset of the data 132 to an instance of virtual application 128 in response to a query initiated or otherwise provided by a virtual application 128. The multi-tenant database 130 may alternatively be referred to herein as an on-demand database, in that the multi-tenant database 130 provides (or is available to provide) data at run-time to on-demand virtual applications 128 generated by the application platform 110.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 is implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like. The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or application platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multitenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request. In this manner, the query generator 114 suitably obtains requested subsets of data 132 accessible to a user and/or tenant from the database 130 as needed to populate the tables, reports or other features of the particular virtual application 128 for that user and/or tenant.

Still referring to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128.

As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 126 such as "account" objects, "opportunity" objects, "contact" objects, or the like. The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130. Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. As noted above, the virtual application 128 may contain Java, ActiveX, or other content that can be presented using conventional client software running on the client device 140; other embodiments may simply provide dynamic web or other content that can be presented and viewed by the user, as desired.

Figure 2:
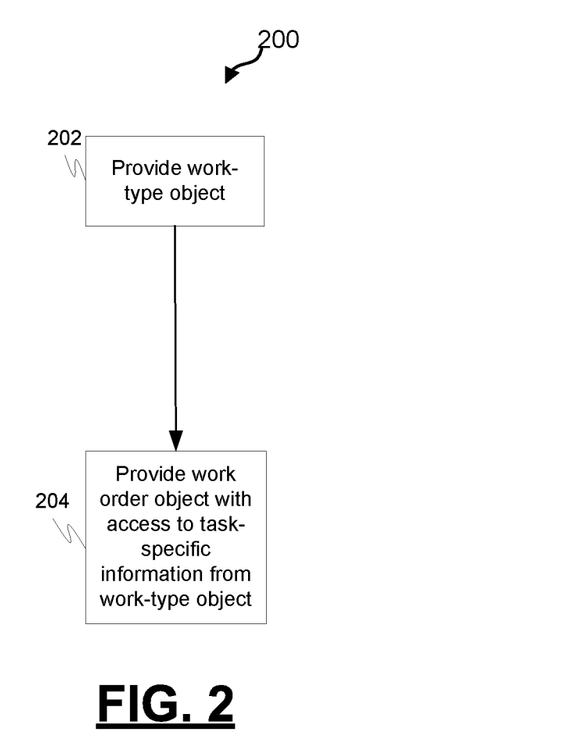
FIG. 2 is a process flow chart depicting an example process for generating a work order object in a database system from a template object.

FIG. 2 is a process flow chart depicting an example process 200 for generating a work order object in a database system from a template object. The example work order object is a database object that represents an item such as a work order or a work order line item that may be generated when a task needs to be performed. For example, a sales representative may generate a work order object representing a work order for a solar installation design or a customer service representative may generate a work order object representing a work order for a recalled item. In each of these cases, a work order object is generated for a task that is to be performed. Generation of the work order object may require knowledge of certain task-specific information. As an example, task-specific information such as "who is qualified to service a work order," "how much time is typically needed to perform the task," and "what knowledge articles are available to assist a technician in performing the task on site" may be provided in the work order object.

The example process 200 includes providing a work-type object (operation 202) for use in generating a work order object. The work-type object can store task-specific information that may be useful for inclusion in work order objects for a task. The work-type object can therefore simplify the generation of a work order object by providing task-specific information for the work order object.

The example work-type object is populated with task-specific information that may be included in a work order object. Example task-specific information that may include estimated task duration, skills required to perform the work order, and relevant knowledge articles.

Users in different tenant domains may generate a work order object for the performance of a task. To increase the usefulness of a work-type object configured to assist with the generation of a work order object that may be generated by users in different tenant domains, the work-type object should be made accessible in multiple tenant domains. The example work-type object is generated from a generic platform entity that can be made accessible to different users within a single tenant domain, e.g., different users within a department of an organization, and users in different tenant domains, e.g., users in different departments of an organization. Access to the platform object, unlike other objects, is not restricted to one specific tenant domain. The platform object has polymorphic lookup properties that allow it to be searchable in multiple tenant domains, i.e., the platform object can be subject to a query from multiple tenant domains, and can map to multiple tenant domains.

After the work-type object is provided, the example process 200 includes providing a work order object with access to the task-specific information (operation 204). An entity generating a work order object for the performance of a task may access the work-type object for the task to generate the work order object. By using the work-type object for the task, the generated work order object can automatically be provided with the task-specific information related to the task.

Also, the generated work order object may be linked to the work-type object along with other work order objects that have been generated using the work-type object. This linking allows for the tracking of work order objects generated for the performance of a common task. Thus, a user accessing the work-type object may identify and potentially access other work order objects generated for the performance of the task. A user may also generate smart analytics from the knowledge of the work order objects generated for the performance of a task.

Figure 3:
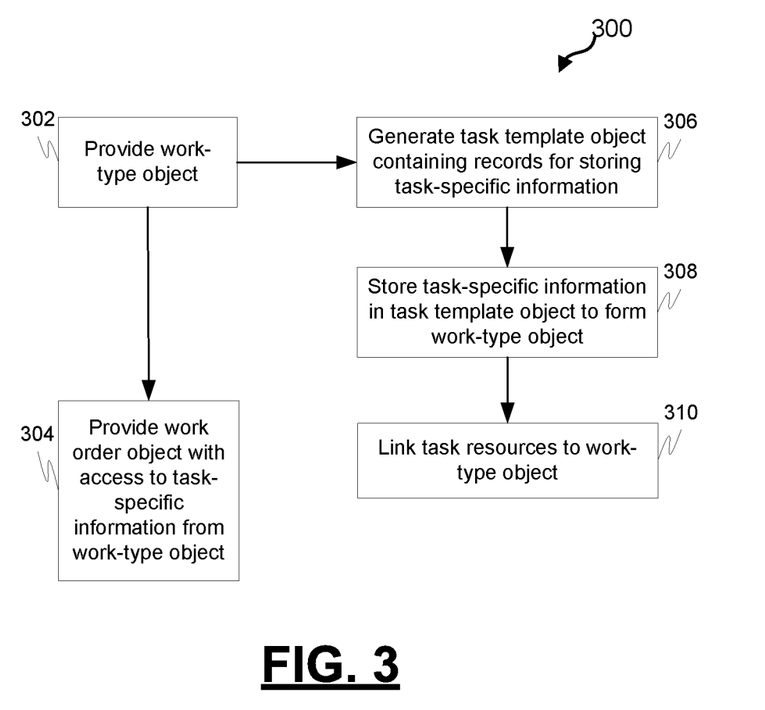
FIG. 3 is a process flow chart depicting another example process for generating a work order object in a database system from a template object.

FIG. 3 is a process flow chart depicting another example process 300 for generating a work order object in a database system from a template object. The example process 300 includes operations similar to those of example process 200. The example process 300 includes providing a work-type object (operation 302) and providing a work order object with access to the task-specific information (operation 304).

In the example process 300, providing a work-type object includes generating a task template object containing one or more task completion storage records for storing task-specific information (operation 306). The task template object may be generated from a generic platform entity with polymorphic lookup properties that allow it to be searchable in multiple tenant domains, i.e., the platform object can be subject to a query from multiple tenant domains, and can map to multiple tenant domains. Thus, the example task template object can be made accessible to different users within a tenant domain, e.g., different users within a department of an organization and users in different tenant domains, e.g., users in different departments of an organization.

In the example process 300, providing a work-type object also includes converting the task template object into a work-type object by storing task-specific information in the task completion storage records in the task template object (operation 308). The example work-type object may include one or more different task completion storage records into which task-specific information may be stored. As an example, a task completion storage record may be provided for an estimated task duration and a task completion storage record may be provided for identifying the skills required to perform the task.

Providing a work-type object may also include linking one or more task resource to the work-type object (operation 310). The example work-type object may also include one or more task completion storage records for identifying a relevant task resource such as a knowledge article related to the task. A task completion storage record that identifies a relevant task resource may be configured to store a database identifier (ID) for linking a task resource such as a knowledge article to the work-type object.

The example work-type object also has a database ID and a record for recording the database ID of one or more tenant-specific objects (e.g., work order objects) that may be mapped to the platform object.

Figure 4:
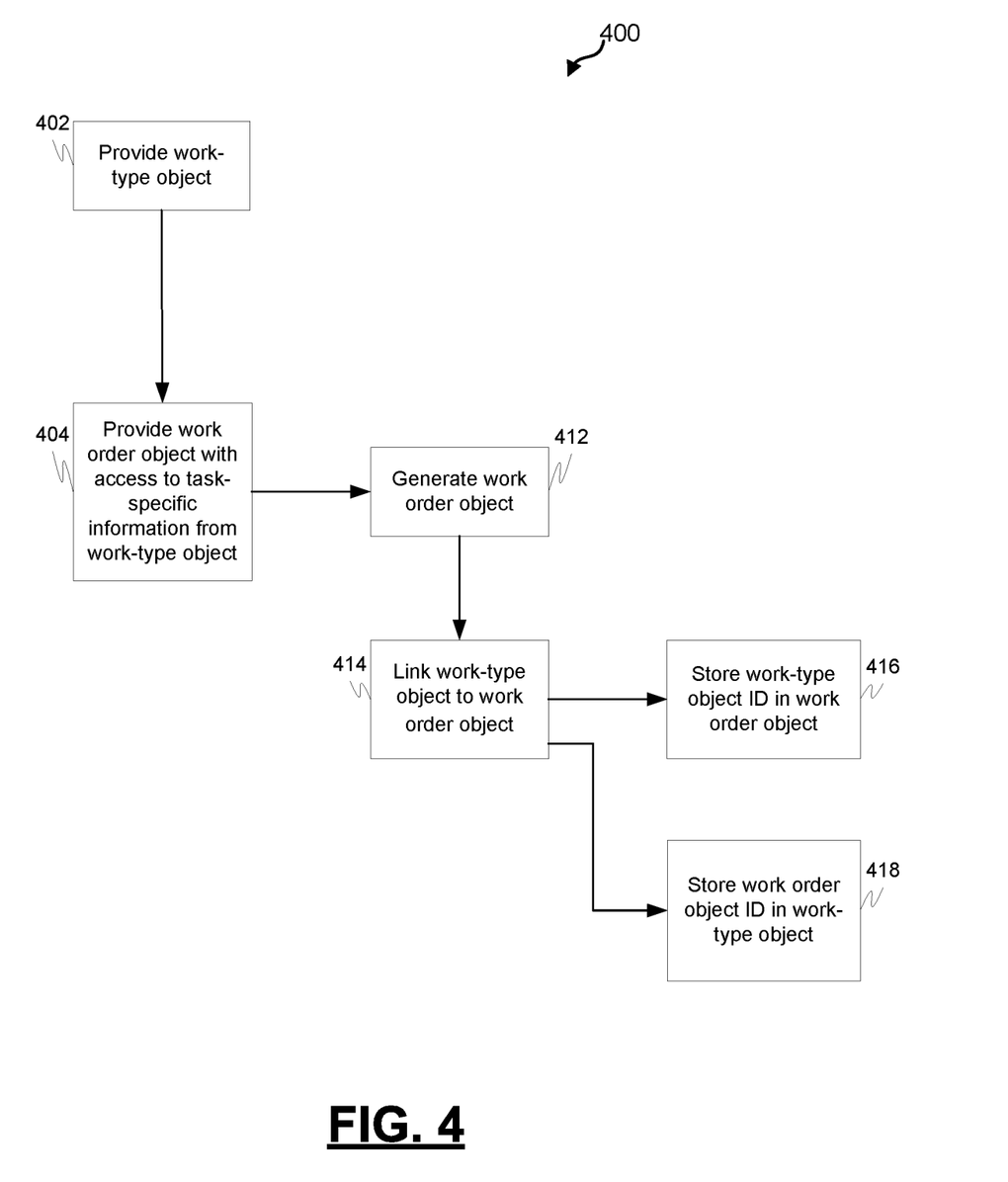
FIG. 4 is a process flow chart depicting another example process for generating a work order object in a database system from a template object.

FIG. 4 is a process flow chart depicting another example process 400 for generating a work order object in a database system from a template object. The example process 400 includes operations similar to those of example process 200. The example process 400 includes providing a work-type object (operation 402) and providing a work order object with access to the task-specific information (operation 404).

In the example process 400, providing a work order object with access to the task-specific information includes generating a work order object (operation 412). As an example, the work order object may be a work order or work order line item used in CRM systems.

The work order object may be customized for a particular task by providing the work order object with access to the task-specific information contained in the work-type object related to the task. The customized work order object may be created by linking the relevant work-type object to the work order object (operation 414). By linking the work-type object to the work order object, the work order object can be provided with task-specific information without the entity creating the work order object having to generate the task-specific information.

Linking the work-type object to the work order object may include storing an identifier for the work-type object in the work order object (operation 416). Because of its polymorphic characteristics, the work-type object may be searched for and linked to work order objects in different tenant domains. By linking the work-type object to the work order object, a user accessing a work order object linked to the work-type object may access the task-specific information stored in the work-type object and may access one or more relevant knowledge articles related to the task that are identified in task completion storage records (via the database ID for the knowledge article) in the work-type object.

Linking the work-type object to the work order object may also include storing the work order object database identifier in a record in the work-type object (operation 418). Storing the work order object database identifier in a record in the work-type object can allow for task tracking and smart analytics. An entity accessing a work order object linked to a work-type object in this manner may through the work-type object identify other work order objects linked to the work-type object to determine additional information relating to the task, such as the personnel who performed the task, how frequently the task has been performed, and how recently the task has been performed.

The order of the performance of operation 416 and operation 418 is not important. For example, operation 416 may be performed before operation 418, operation 418 may be performed before operation 416, or operation 416 and operation 418 may be performed in parallel.

Figure 5:
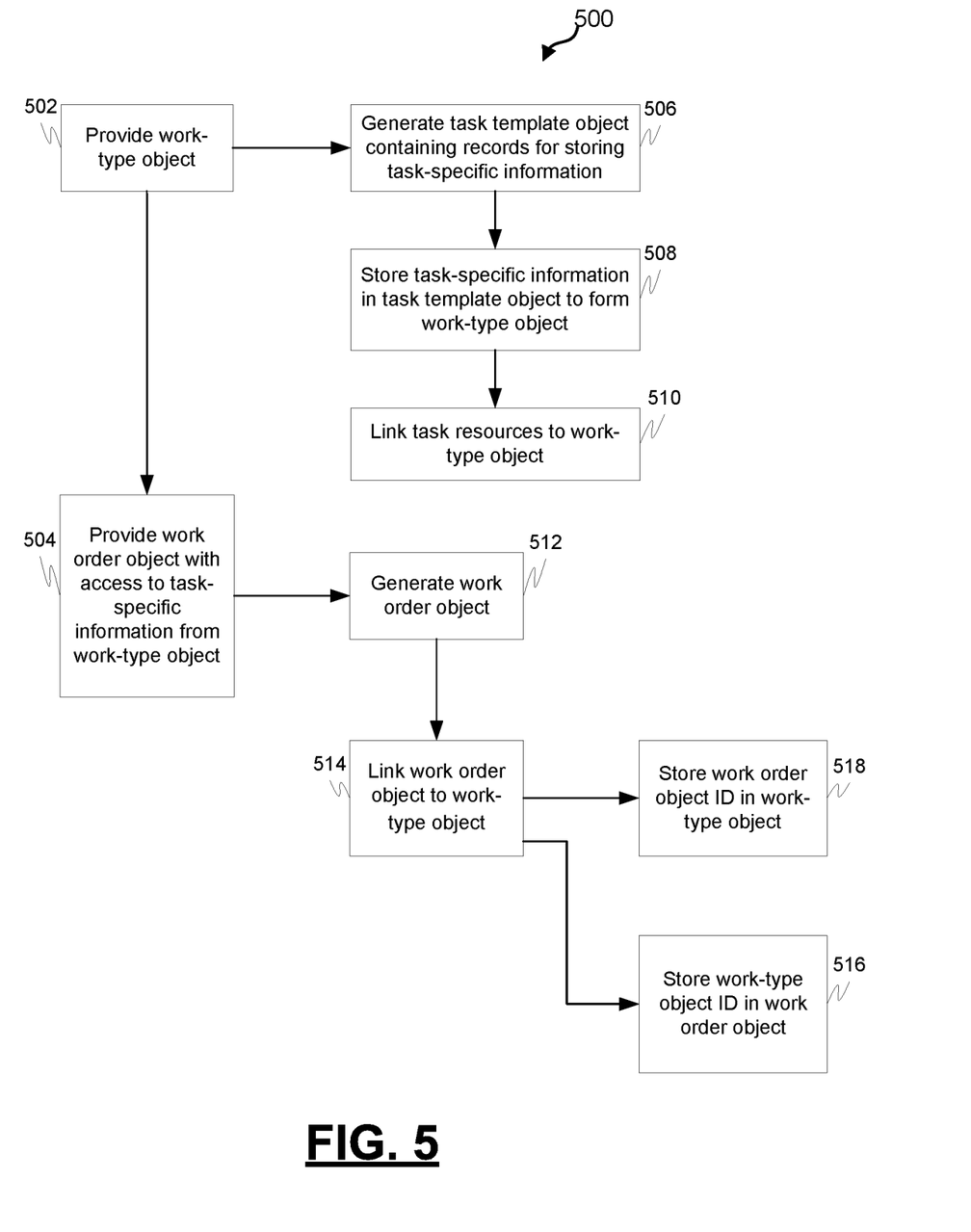
FIG. 5 is a process flow chart depicting another example process for generating a work order object in a database system from a template object.

FIG. 5 is a process flow chart depicting another example process 500 for generating a work order object in a database system from a template object. The example process 500 includes operations similar to those of example processes 300 and 400. In particular, example process 500 includes providing a work-type object (operation 502) and providing a work order object with access to the task-specific information (operation 504).

Providing a work-type object, in this example, includes generating a task template object containing one or more task completion storage records for storing task-specific information (operation 506). The task template object may be generated from a generic platform entity with polymorphic lookup properties that allow it to be searchable in multiple tenant domains, i.e., the platform object can be subject to a query from multiple tenant domains, and can map to multiple tenant domains. Thus, the example task template object can be made accessible to different users within a tenant domain, e.g., different users within a department of an organization, and users in different tenant domains, e.g., users in different departments of an organization.

Providing a work-type object, in this example, also includes converting the task template object into a work-type object by storing task-specific information in the task completion storage records in the task template object (operation 508). The example work-type object may include one or more different task completion storage records into which task-specific information may be stored. As an example, a task completion storage record may be provided for an estimated task duration and a task completion storage record may be provided for identifying the skills required to perform the task.

Providing a work-type object, in this example, may also include linking one or more task resource to the work-type object (operation 510). The example work-type object may also include one or more task completion storage records for identifying a relevant task resource such as a knowledge article related to the task. A task completion storage record that identifies a relevant task resource may be configured to store a database ID for linking a task resource such as a knowledge article to the work-type object.

The example work-type object also has a database ID and a record for recording the database ID of one or more tenant-specific objects (e.g., work order objects) that may be mapped to the platform object.

Providing a work order object with access to the task-specific information, in this example, includes generating a work order object (operation 512). As an example, the work order object may be a work order or work order line item used in CRM systems.

The work order object may be customized for a particular task by providing the work order object with access to the task-specific information contained in the work-type object related to the task. The customized work order object may be created by linking the relevant work-type object to the work order object (operation 514). By linking the work-type object to the work order object, the work order object can be provided with task-specific information without the entity creating the work order object having to generate the task-specific information.

Linking the work-type object to the work order object may include storing an identifier for the work-type object in the work order object (operation 516). Because of its polymorphic characteristics, the work-type object may be searched for and linked to work order objects in different tenant domains. By linking the work-type object to the work order object, a user accessing a work order object linked to the work-type object may access the task-specific information stored in the work-type object and may access one or more relevant knowledge articles related to the task that are identified in task completion storage records (via the database ID for the knowledge article) in the work-type object.

Linking the work-type object to the work order object may also include storing the work order object database ID in a record in the work-type object (operation 518). Storing the work order object database identifier in a record in the work-type object can allow for task tracking and smart analytics. An entity accessing a work order object linked to a work-type object in this manner may through the work-type object identify other work order objects linked to the work-type object to determine additional information relating to the task, such as the personnel who performed the task, how frequently the task has been performed, and how recently the task has been performed.

The order of the performance of operation 516 and operation 518 is not important. For example, operation 516 may be performed before operation 518, operation 518 may be performed before operation 516, or operation 516 and operation 518 may be performed in parallel.

Figure 6:
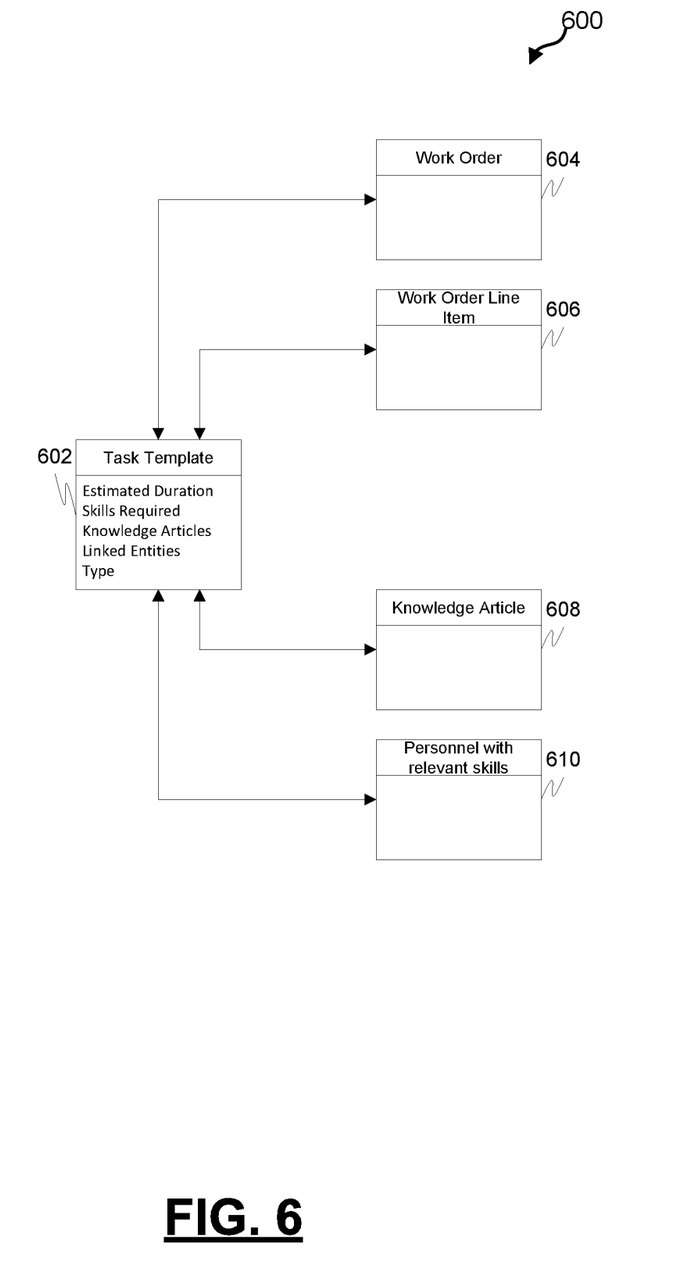
FIG. 6 is a block diagram depicting example connections between example linked objects in a multi-tenant database system.

FIG. 6 is a block diagram depicting example connections between example linked objects in a multi-tenant database system. In this example, a task template object 602 with polymorphic lookup is provided in the multi-tenant database system. The example task template object 602 includes a work-type object identifier (ID) for uniquely identifying the work-type object in the multi-tenant database, a first task completion storage record, e.g., an estimated duration storage record, for storing a first type of task-specific information, a second task completion storage record, e.g., skills required storage record, for storing a second type of task-specific information, and a third task completion storage record, e.g., knowledge articles storage record, for storing a third type of task-specific information. In this example, the first type of task-specific information may include an estimate of the time required to perform the task, the second type of task-specific information may include the skills required of personnel who can complete the task, and the third type of task-specific information may include the object identifier(s) (ID(s)) for any knowledge article object 608 containing a knowledge article that may be relevant to the completion of the task.

The example work-type object 602 further includes a linked entities record for recording the database ID of one or more objects mapped to the work-type object. The objects mapped to the work-type object 602 may include one or more work order objects 604, one or more work order line item objects 606, and/or one or more other objects. The one or more other objects may include, for example, a personnel-with-relevant-skills object 610 that lists personnel with the skills required to perform the task. The work-type object 602 also includes a Type record for identifying the work-type object 602 as a platform object.

The work order object 604 may exist in a first tenant domain, the work-order-line-item object 606 may exist in a second tenant domain, the knowledge article object 608 may exist in a third tenant domain, and some other object, such as a personnel-with-relevant-skills object 610, may exist in a fourth tenant domain. Because the work-type object 602 has polymorphic lookup capability, an entity in any of those domains may access the work-type object 602.

The work-type object 602 provides an entity accessing a tenant-specific object (e.g., work order object, work order line item, etc.) with access to the task-specific information through a tenant-specific object's connection to the work-type object 602 and, in the case of the task-specific information including the ID for a knowledge article object, the tenant-specific object's connection to the knowledge article object 608.

Access may include providing for display in a user interface a computer selectable link that is mapped to the task-specific information via the work-type object and the work order object. In response to actuation of the link, task-specific information may be made available for display. For example, actuation of the link may result in display of a knowledge article in a user display. Access may also include the option to download task-specific information (e.g., the knowledge article), the option to email the task-specific information or other access methods. The database may additionally or alternatively provide a computer selectable link for displaying a listing identifying other tenant-specific objects (e.g., work orders) linked to the work-type object.

Use of the example work-type object may provide a number of benefits. The creation of a work order object may be streamlined through the use of a work-type object saving work order object preparation time and allowing for "smart scheduling" because task-specific information such as the skill and time required for task completion are provided by the work-type object.

Consistency in task performance and customer experience may be another added benefit of using the example work-type object. The example work-type object can be configured to identify task-specific information such as a knowledge article that provides detailed instructions on how to consistently handle a task such as a product recall for consistent customer experience.

The ability to share data regarding experiences when performing a task may be another added benefit of using the example work-type object. By recording the database ID of linked work order objects, the task-specific object can provide additional data regarding task performance such as "how many installations were completed," "how many repairs were scheduled" and others.

In one embodiment, a method in a database system is disclosed. The method comprises generating a task template object from a platform entity with polymorphic lookup capability that can map to multiple tenant domains wherein the task template object contains one or more task completion storage records for storing task-specific information. The method further comprises converting the task template object into a work-type object by storing task-specific information in the one or more task completion storage records wherein the work-type object comprises a work-type object identifier (ID), a first record for recording the database ID of one or more work order objects mapped to the work-type object, and a first task completion storage record for storing a first type of task-specific information. The method further comprises generating a work order object for a task and providing the work order object with access to the task-specific information by linking the work-type object to the work order object wherein the linking comprises storing the work-type object ID in a record in the work order object and storing database ID information for the work order object in the first record in the work-type object.

These aspects and other embodiments may include one or more of the following features. The work-type object may further comprise a second task completion storage record for storing a second type of task-specific information. The first or second type of task-specific information may comprise a database ID for a task-related knowledge article. The first or second type of task-specific information comprises an estimated task duration. The first or second type of task-specific information comprises an identification of skills required for task completion. The method may further comprise generating a second work order object for the task and providing the second work order object with access to the task-specific information by linking the work-type object to the second work order object. Linking the work-type object to the second work order object may comprise storing the work-type object identifier (ID) in a record in the second work order object and storing database ID information for the second work order object in the first record in the work-type object. The method may further comprise providing a listing of work order objects linked to the work-type object. The method may further comprise generating a second work order object for a task in a second tenant domain and providing the second work order object with access to the task-specific information by linking the work-type object to the second work order object. Generating a task template object may comprise generating a platform object and defining the platform object with a record for storing the identifier (ID) of linked work orders and a plurality of task completion storage records. The method may further comprise providing for display in a first user interface a first link that is mapped to the task-specific information via the work-type object and the work order object. The method may further comprise providing a copy of a knowledge article for display in response to actuation of the first link. The method may further comprise providing for display, in response to actuation of the first link, a first listing identifying other work order objects linked to the work-type object.

In another embodiment, a method of retrieving task-specific content from a work order object in a database system is disclosed. The method comprises retrieving a work order object for a task from the database system wherein the work order object is linked to a work-type object by linking operations, the work-type object is generated from a task template object containing a plurality of task completion storage records for storing task-specific information, and the work-type object is generated through the storing of task-specific information in the plurality of task completion storage records. The method further comprises retrieving task-specific information from the work order object.

These aspects and other embodiments may include one or more of the following features. The work-type object may comprise a work-type object identifier (ID) and a first record for recording the database ID of one or more work order objects mapped to the work-type object and the linking operations may comprise storing the work-type object ID in a record in the work order object and storing database ID information for the work order object in the first record in the work-type object.

In another embodiment, a database system is disclosed. The database system comprises one or more processors and non-transient computer readable media coupled to the one or more processors wherein the non-transient computer readable media embodies programming instructions configurable to perform a method. The method comprises retrieving a task template object that contains a plurality of task completion storage records for storing task-specific information, generating a work-type object by storing task-specific information in the plurality of task completion storage records, generating a work order object in a first tenant domain for a task, and providing the work order object with access to the task-specific information by linking the work-type object to the work order object.

These aspects and other embodiments may include one or more of the following features. The work-type object may comprise a work-type object ID and a first record for recording the database identifier (ID) of one or more work order objects mapped to the work-type object and linking the work-type object to the work order object may comprise storing the work-type object ID in a record in the work order object and storing database ID information for the work order object in the first record in the work-type object. The work-type object may further comprise a second task completion storage record for storing a second type of task-specific information. One of the first or second type of task-specific information may comprise a database ID for a task-related knowledge article and the other of the first or second type of task-specific information may comprise an estimated task duration or an identification of skills required for task completion. The method may further comprise generating a second work order object in a second tenant domain for the task and providing the second work order object with access to the task-specific information by linking the work-type object to the second work order object.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices.

Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method in a multi-tenant database system for providing a work order generated in a first tenant domain of the multi-tenant database system with access to data from a second tenant domain of the multi-tenant database system that is not generally accessible in the first tenant domain, the method comprising:

using unique organization identifiers as a filtering criterion to securely isolate data and services provided to each tenant from those provided to other tenants;

generating, for a task, a work order object having a first tenant domain organization identifier that allows the work order object to be accessible via a search or a query to a database user in the first tenant domain but restricted from access via a search or a query to a database user in the second tenant domain, wherein the work order object can access data objects via a search or a query in the first tenant domain but cannot access data objects in the second tenant domain via a search or a query; and providing the work order object having the first tenant domain organization identifier that restricts access to the first tenant domain with access to task-specific information having a second tenant domain organization identifier that restricts access to the second tenant domain by linking the work order object to a work-type object having polymorphic lookup capability via a multi-tenant domain organization identifier that allows the work-type object to map to and be accessible via a search or a query by multiple tenant domains including the first and second tenant domains, the linking the work order object to the work-type object comprising storing a work-type object ID (identifier) for the work-type object in a record in the work order object and storing database ID information for the work order object in a first record in the work-type object;

wherein the work-type object has access to a second tenant domain data object having the second tenant domain organization identifier and having task-specific information that is relevant to the work order object through a linking between the second tenant domain data object and the work-type object, the linking between the second tenant domain data object and the work-type object having been accomplished by an object ID for the second tenant domain data object being stored in a task completion storage record in the work-type object;

wherein the work-type object has been generated from a task template object that includes a plurality of task completion storage records for storing task-specific information from multiple tenant domains and for storing a database ID for a data object, wherein the task-specific information includes at least one of an estimated estimate of the time required to perform the task, skills required of personnel who can complete the task, and a knowledge article that is relevant to completion of the task; and wherein the work-type object has been generated by converting the task template object into the work-type object by storing task-specific information from one or more tenant domains including the second tenant domain in the one or more task completion storage records, the work-type object comprising the work-type object ID, the first record for recording the database ID of one or more work order objects from one or more different tenant domains mapped to the work-type object, a first task completion storage record for storing a first type of task-specific information, and a second task completion storage record for storing the object ID for the second tenant domain data object.

2. The method of claim 1 wherein the work-type object further comprises a third task completion storage record for storing a type of task-specific information that is different from the type of task-specific information stored in the first and second task completion storage records.

3. The method of claim 2 wherein the type of task-specific information stored in one of the first, second, or third task completion storage records comprises an object ID for a task-related knowledge article.

4. The method of claim 3, wherein the type of task-specific information stored in one of the first, second, or third task completion storage records comprises an estimated task duration.

5. The method of claim 4, wherein the type of task-specific information stored in one of the first, second, or third task completion storage records comprises an identification of skills required for task completion.

6. The method of claim 1, further comprising:
generating a second work order object for the task; and
providing the second work order object with access to the task-specific information by linking the work-type object to the second work order object.

7. The method of claim 6, wherein linking the work-type object to the second work order object comprises storing the work-type object ID in a record in the second work order object and storing database ID information for the second work order object in the first record in the work-type object.

8. The method of claim 7, further comprising providing a listing of work order objects linked to the work-type object wherein work order objects from multiple tenant domains are included in the listing.

9. The method of claim 1, further comprising
generating a second work order object for a task in a second tenant domain; and
providing the second work order object with access to the task-specific information by linking the work-type object to the second work order object wherein work order objects from multiple tenant domains are included in a listing.

10. The method of claim 1, wherein the task template object has been generated from a platform entity by generating a platform object and defining the platform object with a record for storing an identifier of linked work orders and a plurality of task completion storage records.

11. The method of claim 1 further comprising:
providing for display in a first user interface accessible via the first tenant domain a first link that is mapped to the task-specific information from the second tenant domain via the work-type object and the work order object.

12. The method of claim 11 further comprising providing a copy of a knowledge article from the second tenant domain for display in response to actuation of the first link from the first user interface accessible via the first tenant domain.

13. The method of claim 11 further comprising providing for display, in response to actuation of the first link, a first listing identifying other work order objects linked to the work-type object.

14. A method of retrieving task-specific content from a second tenant domain of a multi-tenant database system using a work order object generated in a first tenant domain of the multi-tenant database system, the method comprising:
using unique organization identifiers in the multi-tenant database system as a filtering criterion to securely isolate data and services provided to each tenant from those provided to other tenants;
retrieving a work order object in the first tenant domain for a task from the database system using a user interface accessible in the first tenant domain, wherein the work order object has a first tenant domain organization identifier that allows the work order object to be accessible via a search or a query to a database user in the first tenant domain but restricted from access via a search or a query to a database user in the second tenant domain, wherein the work order object can access data objects via a search or a query in the first tenant domain but cannot access data objects in the second tenant domain via a search or a query;
wherein the work order object is linked to a work-type object by linking operations, the linking operations comprising storing a work-type object ID (identifier) for the work-type object in a record in the work order object and storing database ID information for the work order object in a first record in the work-type object, the work-type object having polymorphic lookup capability via a multi-tenant domain organization identifier that allows the work-type object to map to and be accessible via a search or a query by multiple tenant domains including the first and second tenant domains, the work-type object generated from a task template object containing a plurality of task completion storage records for storing task-specific information from multiple tenant domains including a second tenant domain, the work-type object generated through the storing of task-specific information from multiple tenant domains including a second tenant domain in the plurality of task completion storage records;
wherein the work-type object has access to a second tenant domain data object having a second tenant domain organization identifier that restricts access to the second tenant domain and having task-specific information that is relevant to the work order object through a linking between the second tenant domain data object and the work-type object, the linking between the second tenant domain data object and the work-type object having been accomplished by a database ID for the second tenant domain data object being stored in a task completion storage record in the work-type object;
wherein the work-type object comprises the work-type object ID, the first record for recording the database ID of one or more work order objects from one or more different tenant domains mapped to the work-type object, and a first task completion storage record for storing a first type of task-specific information, and a second task completion storage record for storing the database ID for the second tenant domain data object; and
retrieving task-specific information having the second tenant domain organization identifier from the second tenant domain from the work order object from the first task completion storage record of the work-type object and from the second tenant domain data object through the linking between the second tenant domain data object and the work-type object using the user interface accessible in the first tenant domain.

15. The method of claim 14, further comprising providing for display in a first user interface accessible via the first tenant domain a first link that is mapped to the task-specific information from the second tenant domain via the work-type object and the work order object.

16. A multi-tenant database system comprising one or more processors and non-transitory computer readable media coupled to the one or more processors, the non-transitory computer readable media embodying programming instructions configurable to perform a method in the multi-tenant database system for providing a work order generated in a first tenant domain of the multi-tenant database system with access to data from a second tenant domain of the multi-tenant database system that is not generally accessible in the first tenant domain, the method comprising:

using unique organization identifiers in the multi-tenant database system as a filtering criterion to securely isolate data and services provided to each tenant from those provided to other tenants;

generating, for a task, a work order object having a first tenant domain organization identifier that allows the work order object to be accessible via a search or a query to a database user in the first tenant domain but restricted from access via a search or a query to a database user in the second tenant domain, wherein the work order object can access data objects via a search or a query in the first tenant domain but cannot access data objects in the second tenant domain via a search or a query; and providing the work order object having the first tenant domain organization identifier that restricts access to the first tenant domain with access to task-specific information having a second tenant domain organization identifier that restricts access to the second tenant domain by linking the work order object to a work-type object having polymorphic lookup capability via a multi-tenant domain organization identifier that allows the work-type object to map to and be accessible via a search or a query by multiple tenant domains including the first and second tenant domains, the linking the work order object to the work-type object comprising storing a work-type object ID (identifier) for the work-type object in a record in the work order object and storing database ID information for the work order object in a first record in the work-type object;

wherein the work-type object has access to a second tenant domain data object having the second tenant domain organization identifier and having task-specific information that is relevant to the work order object through a linking between the second tenant domain data object and the work-type object, the linking between the second tenant domain data object and the work-type object having been accomplished by an object ID for the second tenant domain data object being stored in a task completion storage record in the work-type object;

wherein the work-type object has been generated from a task template object that includes a plurality of task completion storage records for storing task-specific information from multiple tenant domains and for storing a database ID for a data object, wherein the task-specific information includes at least one of an estimated time required to perform the task, skills required of personnel who can complete the task, and a knowledge article that is relevant to completion of the task; and wherein the work-type object has been generated by converting the task template object into the work-type object by storing task-specific information from one or more tenant domains including the second tenant domain in the one or more task completion storage records, the work-type object comprising the work-type object ID, the first record for recording the database ID of one or more work order objects from one or more different tenant domains mapped to the work-type object, a first task completion storage record for storing a first type of task-specific information, and a second task completion storage record for storing the object ID for the second tenant domain data object.

17. The multi-tenant database system of claim 16, wherein the work-type object further comprises a third task completion storage record for storing a type of task-specific information that is different from the type of task-specific information stored in the first and second task completion storage records.

18. The multi-tenant database system of claim 17, wherein the type of task-specific information stored in one of the first, second, or third task completion storage records comprises an object ID for a task-related knowledge article.

19. The multi-tenant database system of claim 18, wherein the type of task-specific information stored in one of the first, second, or third task completion storage records comprises an estimated task duration and the type of task-specific information stored in another of the first, second, or third task completion storage records comprises an identification of skills required for task completion.

20. The multi-tenant database system of claim 16, wherein the method further comprises:

generating a second work order object in a second tenant domain for the task; and providing the second work order object with access to the task-specific information by linking the work-type object to the second work order object.

\* \* \* \* \*